UNITED STATES PATENT OFFICE.

FRANZ SCHOLL, OF HÖCHST-ON-THE-MAIN, GERMANY, ASSIGNOR TO THE FARBWERKE, VORMALS MEISTER, LUCIUS & BRÜNING, OF SAME PLACE.

YELLOW BASIC DISAZO DYE AND PROCESS OF MAKING SAME.

SPECIFICATION forming part of Letters Patent No. 617,544, dated January 10, 1899.

Application filed July 8, 1898. Serial No. 685,429. (No specimens.)

*To all whom it may concern:*

Be it known that I, FRANZ SCHOLL, doctor of philosophy, a citizen of the Empire of Germany, residing at Höchst-on-the-Main, Germany, have invented certain new and useful Improvements in the Manufacture of Yellow Dyestuffs, of which the following is a description.

This invention relates to the production of new yellow-dyeing dyestuffs.

I have found that aceto-acetanilid of the formula $CH_3COOH_2CONHC_6H_5$, as well as its homologues, can be advantageously employed as a combining substance for the production of basic azo coloring-matters. Valuable products are the basic disazo dyestuffs obtained by combining aceto-acetanilid with the diazo compounds of amidoammonium-azo bodies of the general formula $ClR_3N$ arom. Radical $N=N$ (1) alphyl (4) $NH_2$. They dye wool and cotton evenly in an acid-bath.

The process of producing this dye consists in diazotizing the amidoammonium-azo dyestuffs obtained from diazotized aromatic amidoammonium bases and primary amins—such as alpha-naphthylamin, paraxylidin, metaämido-para-kresolether, metatoluidin—and combining them with the aceto-acetanilid or its homologues.

Example: 4.8 kilograms zinc-chlorid double salt of hydrochlorid of metatrimethylammoniumphenyl-azo-metatoluidin, produced by the reaction of diazotized metaämidophenyltrimethylammonium upon metatoluidin, are dissolved in about one hundred and fifty liters of water and diazotized by adding 2.4 kilograms hydrochloric acid and 0.69 kilograms nitrite of sodium. The diazo solution is then run into an aqueous suspension of 1.9 kilograms of finely-ground aceto-acetanilid, to which are added three kilograms acetate of sodium, whereupon the aceto-acetanilid slowly dissolves. After a short time the solution is heated and salted out with common salt.

The dyestuff thus obtained is an orange-yellow powder easily soluble in water with a yellow color and with difficulty in alcohol. It is insoluble in ether, benzene, petroleum, and chloroform. In concentrated sulfuric acid it dissolves with a carmine-red color, which turns on heating or standing for some time into blue violet.

Having now described my invention, what I claim is—

1. The process of producing basic disazo dyestuffs, consisting in diazotizing amidoazo dyestuffs obtained from diazotized aromatic amidoammonium bases and primary alphylamins, and allowing them to act upon aceto-acetanilid, substantially as set forth.

2. As a new product, the azo dyestuff derived from diazotised metatrimethylammoniumphenyl-azo-metatoluidin and aceto-acetanilid, being an orange-yellow powder, easily soluble in water with a yellow color, soluble with difficulty in alcohol, insoluble in petroleum ether, benzene and chloroform, its solution in concentrated sulfuric acid being carmine-red, it turning into blue violet on heating or standing for some time, and dyeing cotton as well as wool and half-wool light yellow in an acid bath, substantially as set forth.

In testimony that I claim the foregoing as my invention I have signed my name in presence of two subscribing witnesses.

FRANZ SCHOLL.

Witnesses:
HEINRICH HAHN,
BERNHARD LEYDECKER.